US012675947B2

(12) United States Patent
Wang

(10) Patent No.: US 12,675,947 B2
(45) Date of Patent: Jul. 7, 2026

(54) THREE-DIMENSIONAL POINT CLOUD GENERATION METHOD, APPARATUS AND ELECTRONIC DEVICE

(71) Applicant: Beijing Baidu Netcom Science Technology Co., Ltd., Beijing (CN)

(72) Inventor: Haijun Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 280 days.

(21) Appl. No.: 18/306,019

(22) Filed: Apr. 24, 2023

(65) Prior Publication Data

US 2023/0260211 A1     Aug. 17, 2023

(30) Foreign Application Priority Data

Apr. 24, 2022     (CN) ......................... 202210466322.X

(51) Int. Cl.
| | |
|---|---|
| *G06T 17/00* | (2006.01) |
| *G06T 5/70* | (2024.01) |
| *G06T 7/50* | (2017.01) |
| *G06T 7/73* | (2017.01) |

(52) U.S. Cl.
CPC .............. *G06T 17/00* (2013.01); *G06T 5/70* (2024.01); *G06T 7/50* (2017.01); *G06T 7/75* (2017.01)

(58) Field of Classification Search
CPC ... G06T 7/50; G06T 5/70; G06T 2207/10028; G06T 17/00
See application file for complete search history.

(56) References Cited

U.S. PATENT DOCUMENTS

| | | | |
|---|---|---|---|
| 2018/0218513 A1* | 8/2018 | Ho | G06T 7/579 |
| 2022/0215565 A1 | 7/2022 | Jiang et al. | |
| 2024/0153233 A1* | 5/2024 | Nakano | G06V 10/462 |

FOREIGN PATENT DOCUMENTS

| | | |
|---|---|---|
| CN | 107545537 A | 1/2018 |
| CN | 110580720 A | 12/2019 |
| CN | 111080804 A | 4/2020 |
| CN | 111369666 A | 7/2020 |

(Continued)

OTHER PUBLICATIONS

Chinese Office Action concerning Chinese Patent Application No. 202210466322.X, dated Oct. 19, 2022. (11 Pages).

(Continued)

*Primary Examiner* — Ryan McCulley
(74) *Attorney, Agent, or Firm* — Maginot, Moore & Beck LLP

(57)     ABSTRACT

The present disclosure provides a three-dimensional point cloud generation method, apparatus and an electronic device, and relates to the field of artificial intelligence technologies such as virtual reality, augmented reality and computer vision. A specific scheme includes: generating a two-dimensional (2D) depth map of a first three-dimensional (3D) image; calculating gradient values of multiple pixels in the 2D depth image, and performing filter process on the 2D depth image based on the gradient values of the multiple pixels to obtain a target depth image; and generating a 3D point cloud of the first 3D image based on the target depth map. According to the present disclosure, a generation efficiency of the three-dimensional point cloud can be improved.

13 Claims, 5 Drawing Sheets

(56) References Cited

FOREIGN PATENT DOCUMENTS

| | | | |
|---|---|---|---|
| CN | 112488910 | A | 3/2021 |
| CN | 112652016 | A | 4/2021 |
| CN | 113012210 | A | 6/2021 |
| CN | 113409442 | A | 9/2021 |
| CN | 113724368 | A | 11/2021 |
| CN | 113936085 | A | 1/2022 |
| JP | 2018115883 | A | 7/2018 |

OTHER PUBLICATIONS

English Translation of Chinese Office Action concerning Chinese Patent Application No. 202210466322.X, dated Oct. 19, 2022. (10 Pages).
Machine English Translation of CN107545537A. (10 Pages).
Machine English Translation of CN111080804A. (26 Pages).
Machine English Translation of CN113409442A. (14 Pages).
Machine English Translation of JP2018115883A. (9 Pages).
Machine English Translation of CN110580720A. (15 Pages).
Machine English Translation of CN111369666A. (22 Pages).
Machine English Translation of CN112488910A. (34 Pages).
Machine English Translation of CN112652016A. (21 Pages).
Machine English Translation of CN113724368A. (24 Pages).
Machine English Translation of CN113936085A. (45 Pages).

* cited by examiner

THREE-DIMENSIONAL POINT CLOUD GENERATION METHOD, APPARATUS AND ELECTRONIC DEVICE

CROSS-REFERENCE TO RELATED APPLICATION

The present application claims a priority to Chinese patent application No. 202210466322.X filed in China on Apr. 24, 2022, the disclosure of which is incorporated herein by reference in its entirety.

TECHNICAL FIELD

The present disclosure relates to the field of artificial intelligence technologies such as virtual reality, augmented reality and computer vision, in particular to a three-dimensional point cloud generation method, apparatus and an electronic device.

BACKGROUND

In some scenarios such as virtual reality (VR) or augmented reality (AR) house viewing, it is necessary to obtain a three-dimensional (3D) point cloud.

At present, a common method for obtaining a 3D point cloud includes: directly performing monocular depth estimation based on deep learning to generate a 3D point cloud, and then performing denoising on the 3D point cloud. However, such denoising of the 3D point cloud is performed in 3D space and performs mathematical calculations on the generated 3D point cloud.

SUMMARY

The present disclosure provides a three-dimensional point cloud generation method, apparatus, an electronic device and a storage medium.

According to a first aspect of the present disclosure, a three-dimensional point cloud generation method is provided, including generating a two-dimensional (2D) depth map of a first three-dimensional (3D) image, and calculating gradient values of multiple pixels in the 2D depth image, and performing a filter process on the 2D depth image based on the gradient values of the multiple pixels to obtain a target depth image. The method also includes generating a 3D point cloud of the first 3D image based on the target depth map.

According to a second aspect of the present disclosure, a three-dimensional point cloud generation apparatus has multiple modules. A first generation module is configured to generate a two-dimensional (2D) depth map of a first three-dimensional (3D) image. A filtering module is configured to calculate gradient values of multiple pixels in the 2D depth image, and perform a filter process on the 2D depth image based on the gradient values of the multiple pixels to obtain a target depth image. A second generating module is configured to generate a 3D point cloud of the first 3D image based on the target depth map.

According to a third aspect of the present disclosure, an electronic device includes at least one processor and a memory communicatively coupled to the at least one processor. The memory stores therein at least one instruction configured to be executed by the at least one processor, and the at least one processor is configured to execute the at least one instruction to implement the method according to the first aspect of the present disclosure.

According to a fourth aspect of the present disclosure, a non-transitory computer readable storage medium is provided, storing therein a computer instruction, wherein the computer instruction is configured to be executed by a computer, to implement the method according to the first aspect of the present disclosure.

According to a fifth aspect of the present disclosure, a computer program product is provided, including a computer program, wherein the computer program is configured to be executed by a processor, to implement the method according to the first aspect of the present disclosure.

In the embodiment of the present disclosure, by generating the 2D depth map of the first 3D image, performing a filter process on the 2D depth image and then generating the 3D point cloud of the first 3D image based on the target depth map which has been filtered, it enables performing a filter process on the 2D image, thereby saving processing time and improving generation efficiency of the 3D point cloud.

It should be understood that what is described in this section is not intended to identify key or critical features of embodiments of the disclosure, nor is it intended to limit the scope of the disclosure. Other features of the present disclosure will become readily understood from the following description.

BRIEF DESCRIPTION OF THE DRAWINGS

The drawings are included to provide a better understanding of the application and are not to be construed as limiting the present application. Wherein.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

Figure 1:
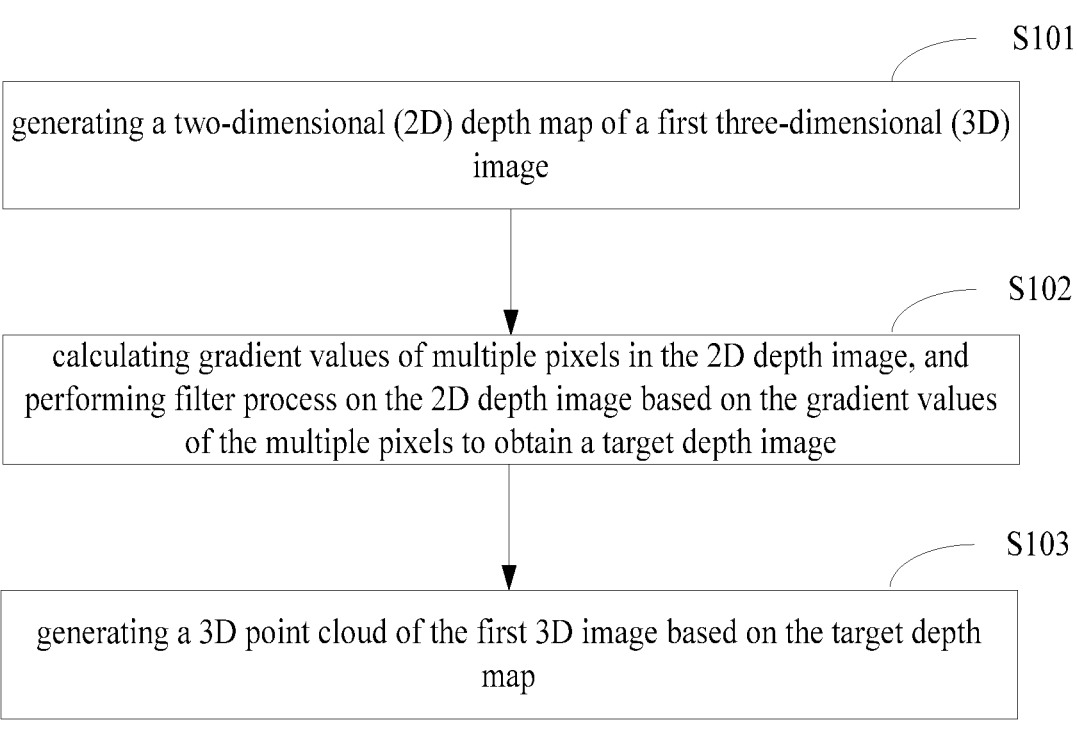
FIG. 1 is a first schematic flowchart of a three-dimensional point cloud generation method according to an embodiment of the present disclosure.

As shown in FIG. 1, according to an embodiment of the present disclosure, the present disclosure provides a three-dimensional point cloud generation method, which can be performed by an electronic device. The method includes the following steps.

Step S101: generating a two-dimensional (2D) depth map of a first three-dimensional (3D) image.

The first 3D image may be obtained in advance. The first 3D image may be a 3D image of any object, and the 3D image may be a panorama of the object and may be used for VR viewing and the like. After the first 3D image is obtained, the corresponding 2D depth map can be generated. On the one hand, a depth map corresponding to the first 3D image may be generated. On the other hand, dimensionality reduction processing from 3D to 2D can be realized, so that an obtained depth map is a 2D depth map.

Step S102: calculating gradient values of multiple pixels in the 2D depth image, and performing a filter process on the 2D depth image based on the gradient values of the multiple pixels to obtain a target depth image.

In some embodiments, the above multiple pixels may include each pixel in the above 2D depth map. Alternatively, in other embodiments, the above multiple pixels may include some pixels in the above 2D depth map; for example, in some scenes, for some edge areas, only some pixels may be calculated, because in some scenes, gradient values of pixels in the edge areas are often the same or similar.

A gradient value of one pixel can represent a rate of change of the one pixel relative to an adjacent pixel in a certain direction. In this embodiment, the gradient values of multiple pixels in the 2D depth map can be calculated, and then the filter process is performed on the 2D depth image based on the gradient values of the multiple pixels in the two-dimensional depth map, thereby realizing deletion of noise pixels in the 2D depth image, i.e., realizing the denoising of the 2D depth image and obtaining the target depth image. It is to be understood that since the depth map is a map in a two-dimensional space, during the filtering process, denoising process is performed in the two-dimensional space to realize image denoising and obtain the target depth map. The obtained target depth map is a map in the two-dimensional space.

Step S103: generating a 3D point cloud of the first 3D image based on the target depth map.

After the target depth map is obtained by performing the filter process on the 2D depth map, the 2D target depth map can be mapped to the 3D point cloud of the first 3D image, thereby realizing generation of the 3D point cloud. Since the target depth map is a depth map which has been denoised by the filter process, the 3D point cloud generated by using the target depth map may be understood as a 3D point cloud which has been denoised, thereby realizing the denoising of the 3D point cloud. It is to be noted that there are many ways to generate the 3D point cloud of the first 3D image, which are not specifically limited in this embodiment. For example, in one example, the target depth map may be mapped, through 3D geometry, to the 3D point cloud of the first 3D image.

In the embodiment of the present disclosure, by generating the 2D depth map of the first 3D image, performing a filter process on the 2D depth image and then generating the 3D point cloud of the first 3D image based on the target depth map which has been denoised, it enables performing a filter process on the 2D image, thereby saving processing time and improving generation efficiency of the 3D point cloud.

In addition, since the target depth map is a depth map which has been processed by the filter process, the number of pixels in the target depth map can be reduced. In this way, by using the target depth map with reduced number of pixels to generate the 3D point cloud, it can reduce time-consuming of generating the 3D point cloud, and further improve efficiency of obtaining the 3D point cloud. In addition, due to reduction of the number of pixels in the target depth map, memory consumption can be reduced in the process of generating the 3D point cloud, which can save memory.

Figure 2:
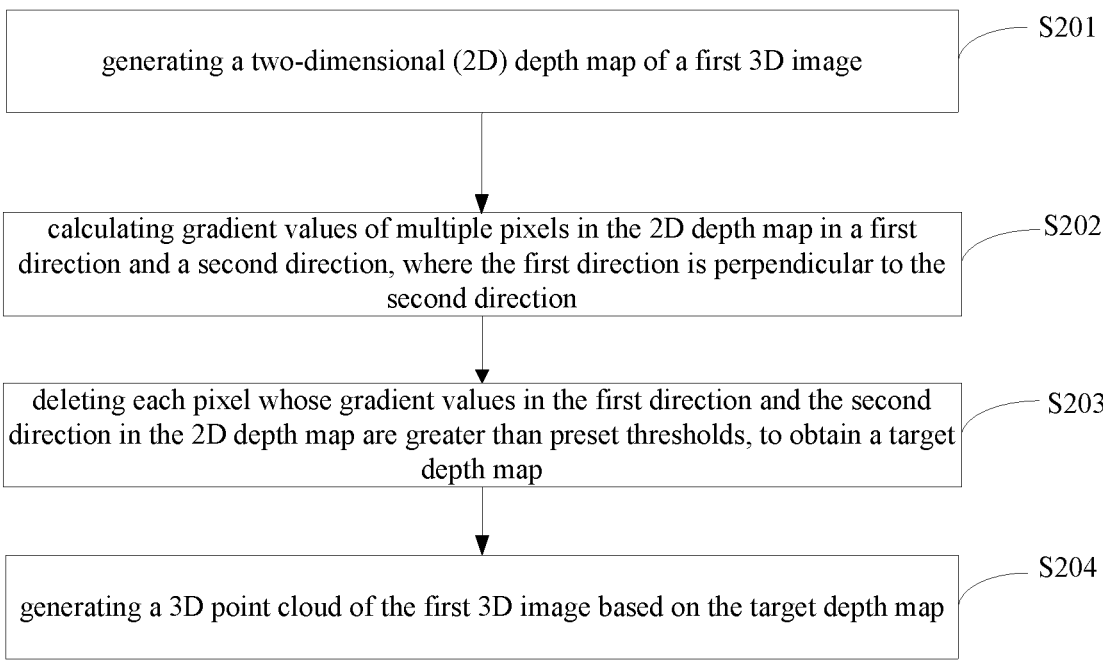
FIG. 2 is a second schematic flowchart of a three-dimensional point cloud generation method according to an embodiment of the present disclosure.

As shown in FIG. 2, in one embodiment, the method includes the following steps.

Step S201: generating a two-dimensional (2D) depth map of a first 3D image.

Step S202: calculating gradient values of multiple pixels in the 2D depth map in a first direction and a second direction, where the first direction is perpendicular to the second direction.

Step S203: deleting each pixel whose gradient values in the first direction and the second direction in the 2D depth map are greater than preset thresholds, to obtain a target depth map.

Step S204: generating a 3D point cloud of the first 3D image based on the target depth map.

Gradient values of one pixel includes a gradient value in the first direction and a gradient value in the second direction, where the gradient value in the first direction represents a rate of change of the pixel in the first direction, and the gradient value in the second direction represents a rate of change of the pixel in the second direction. The first direction is perpendicular to the second direction. For example, the first direction may be the horizontal direction (i.e., x direction), then the second direction may be the vertical direction (i.e., y direction); or, the first direction may be the vertical direction, then the second direction may be the horizontal direction.

By comparing the gradient values of each pixel in the 2D depth map in the first direction and the second direction with the preset thresholds respectively, each pixel whose gradient values in the first direction and the second direction in the 2D depth map are greater than preset thresholds, is deleted, thereby realizing filtering of pixels of the 2D depth map, i.e., realizing the denoising of the 2D depth image and obtaining the target depth image.

In the process of performing filtering of pixels of the 2D depth map in this embodiment, since the gradient values of each pixel in two directions are compared with the preset thresholds respectively, each pixel whose gradient values in the two directions are both greater than the preset thresholds, is deleted, which can realize filtering of pixels and improve accuracy of filtering of pixels in the 2D depth map.

In one embodiment, the calculating gradient values of multiple pixels in the 2D depth map in a first direction and a second direction, includes:

performing a convolution operation on the 2D depth image through two predefined convolution kernels to obtain the gradient values of multiple pixels in the 2D depth map in the first direction and the second direction, where the two convolution kernels are corresponding to the first direction and the second direction, respectively.

It is to be understood that gradient values of multiple pixels in the 2D depth map in the first direction are obtained by performing a convolution operation on the 2D depth image through one convolution kernel, and gradient values of multiple pixels in the 2D depth map in the second direction are obtained by performing a convolution operation on the 2D depth image through the other one convolution kernel. In one example, dimensions of the two convolution kernels may be the same. In this embodiment, the dimensions of the convolution kernels are not specifically limited, for instance, in one example, the dimensions of the two convolution kernels may both be M×M, that is, a convolution kernel with M rows and M columns, where Mis an integer greater than 1. For example, M may be 3, and forms of the two convolution kernels may be shown in Table 1 and Table 2, respectively.

TABLE 1

| -2 | 0 | 2 |
|----|---|---|
| -4 | 0 | 4 |
| -2 | 0 | 2 |

TABLE 2

| -2 | -4 | 2 |
|----|----|---|
| 0 | 0 | 0 |
| 2 | 4 | 2 |

In this embodiment, the gradient values of multiple pixels in the first direction and the second direction in the 2D depth map can be obtained by performing the convolution operation on the 2D depth image through two different convolution kernels, thereby improving accuracy of the gradient values of multiple pixels in the first direction and the second direction in the 2D depth map.

Figure 3:
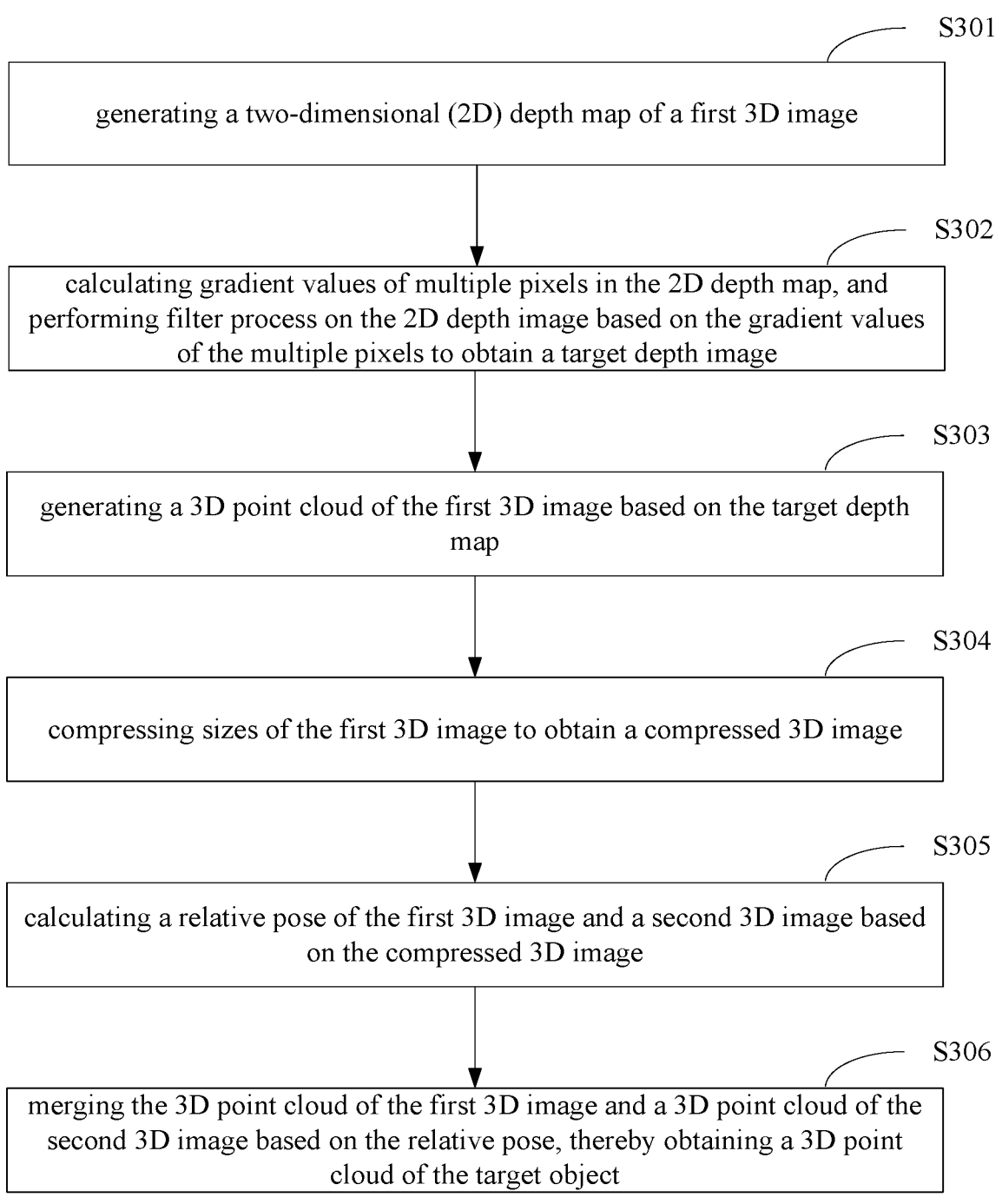
FIG. 3 is a third schematic flowchart of a three-dimensional point cloud generation method according to an embodiment of the present disclosure.

As shown in FIG. 3, in one embodiment, the method includes the following steps.

Step 301: generating a two-dimensional (2D) depth map of a first 3D image.

Step S302: calculating gradient values of multiple pixels in the 2D depth map, and performing a filter process on the 2D depth image based on the gradient values of the multiple pixels to obtain a target depth image.

Step S303: generating a 3D point cloud of the first 3D image based on the target depth map.

Step S304: compressing sizes of the first 3D image to obtain a compressed 3D image.

Step S305: calculating a relative pose of the first 3D image and a second 3D image based on the compressed 3D image; where a shooting point of the second 3D image is adjacent to a shooting point of the first 3D image, and the first 3D image and the second 3D image are panoramic images obtained by shooting a target object at adjacent shooting points.

Step S306: merging the 3D point cloud of the first 3D image and a 3D point cloud of the second 3D image based on the relative pose, thereby obtaining a 3D point cloud of the target object.

It is to be noted that there are various compression modes, and in this embodiment, the mode adopted for compressing the first 3D image is not specifically limited. The target object can be photographed at adjacent shooting points in advance to obtain the first 3D image and the second 3D image. For example, a camera shoots at a first shooting point to obtain the first 3D image of the target object; then the shooting point of the camera is changed and then the camera shoots at a second shooting point adjacent to the first shooting point to obtain the second 3D image of the target object. It is to be noted that the target object may be any object, for example, in a VR room viewing scenario, the target object may be a room, etc.

In this embodiment, the relative pose can reflect a pose difference between the first 3D image and the second 3D image. Since the first 3D image and the second 3D image are images shot at different shooting points, there may be differences in poses between the first 3D image and the second 3D image. The relative pose of the first 3D image and the second 3D image may be calculated to determine the pose difference between the first 3D image and the second 3D image, and then the 3D point cloud of the first 3D image and the 3D point cloud of the second 3D images are merged by using the relative pose, thereby obtaining the 3D point cloud of the target object, which can improve accuracy of the obtained 3D point cloud. In addition, before calculating the relative pose, the sizes of the first 3D image may be compressed to reduce image sizes to obtain a compressed 3D image; in the process of calculating the relative pose, the compressed 3D image with reduced image sizes is used to calculate the relative pose of the first 3D image and the second 3D image, which can reduce calculation amount and memory consumption, thereby improving efficiency of calculating the relative pose. Then, based on the relative pose, the 3D point cloud of the first 3D image and the 3D point cloud of the second 3D image are merged, thereby obtaining the 3D point cloud of the target object, which can improve accuracy of obtaining the 3D point cloud of the target object.

In one embodiment, the calculating a relative pose of the first 3D image and a second 3D image based on the compressed 3D image, includes:

extracting first feature point information of the compressed 3D image;

based on the first feature point information and second feature point information of the second 3D image, calculating the relative pose of the first 3D image and the second 3D image.

Feature points can be understood as special, representative or salient points in an image, which may reflect some features of the image. It is to be noted that there are many ways to extract feature point information, which are not specifically limited in the embodiment of the present disclosure. For example, in one example, first feature point information of the compressed 3D image may be extracted through oriented FAST and rotated brief (ORB) algorithm, and second feature point information of the second 3D image may be extracted in advance through the ORB algorithm, and the first feature point information and the second feature point information of the second 3D image are used to calculate the relative pose.

In this embodiment, in the process of calculating the relative pose, the first feature point information is extracted from the compressed 3D image with reduced image size, which can improve efficiency of extracting the feature point information. Further, the first feature point information of the first 3D image and the second feature point information of the second 3D image are used to calculate the relative pose of the first 3D image and the second 3D image, instead of using all points of an entire image to calculate the relative pose, which can reduce calculation amount and reduce memory consumption, thereby improving efficiency of obtaining the relative pose. Then, based on the relative pose, the 3D point cloud of the first 3D image and the 3D point cloud of the second 3D image are merged, thereby obtaining the 3D point cloud of the target object, which can improve efficiency of obtaining the 3D point cloud of the target object. Meanwhile, the first feature point information may reflect special points, representative points or salient points of the first 3D image, and the second feature point information may reflect special points, representative points or salient points of the second 3D image; and using the first feature point information and the second feature point information to calculate the relative pose of the first 3D image and the second 3D image can improve accuracy of the obtained relative pose.

In this embodiment, based on the first feature point information and second feature point information of the second 3D image, calculating the relative pose of the first 3D image and the second 3D image, includes:

based on the first feature point information and the second feature point information of the second 3D image, determining N feature point pairs of the first 3D image and the second 3D image; where similarity of at least some feature point pairs of the N feature point pairs is higher than that of other feature point pairs, and the other feature point pairs are feature point pairs other than the N feature point pairs in the first 3D image and the second 3D image and N is an integer greater than 1;

calculating an essential matrix of the first 3D image and the second 3D image based on the N feature point pairs; and determining the relative pose of the first 3D image and the second 3D image according to the essential matrix.

It is to be understood that the first 3D image is corresponding to the first feature point information, and the second 3D image is corresponding to the second feature point information; in this way, for the first 3D image and the second 3D image, multiple feature point pairs can be formed and each feature point pair includes one piece of feature point information in the first feature point information and one piece of feature point information in the second feature point information; and other feature point pairs may be feature point pairs of the multiple feature point pairs except for the N feature point pairs. The above similarity of at least some feature point pairs in the N feature point pairs being higher than the similarity of other feature point pairs may be that the similarity of any feature point pair in the N feature point pairs is higher than the similarity of other feature point pairs, that is, the N feature point pairs are feature point pairs with highest similarity in the first 3D image and the second 3D image. Alternatively, the above similarity of at least some feature point pairs in the N feature point pairs being higher than the similarity of other feature point pairs may be that the similarity of (N−1) or (N−2) feature point pairs in the N feature point pairs is higher than the similarity of other feature point pairs; in this case, the essential matrix of the first 3D image and the second 3D image can also be calculated.

In the process of calculating the essential matrix of the first 3D image and the second 3D image based on the N feature point pairs, an initial essential matrix is solved based on the N feature point pairs, thereby obtaining the essential matrix of the first 3D image and the second 3D image. For example, in case that the above N is 8, the 8-point method is directly used to solve the essential matrix of the first 3D image and the second 3D image. It is to be noted that, in the present disclosure, N may also be equal to 16, 24 and other values in addition to 8, so that the essential matrix of the first 3D image and the second 3D image can be solved based on more feature point pairs. For some simple 3D images, 5 feature points may also be adopted, and then 5-point method is used to solve the essential matrix of the first 3D image and the second 3D image.

The essential matrix is used to reflect relationship of a pixel in space in 3D images under different viewing angles of the camera, so that the essential matrix can determine relationship between multiple pixels in the first 3D image and the second 3D image, thereby obtaining the relative pose of the first 3D image and the second 3D image. For example, singular value decomposition is performed on the essential matrix to obtain a singular value decomposition result, and the relative pose of the first 3D image and the second 3D image is determined based on the singular value decomposition result.

In this embodiment, the relative pose of the first 3D image and the second 3D image is determined by the essential matrix, which can improve accuracy of the relative pose.

The process of the above 3D point cloud generation method is described hereinafter in details with a specific embodiment in which an VR room viewing scene is taken as an example. The process of the above 3D point cloud generation method is as follows.

First, a first panoramic image of a room is obtained, and a 2D depth map of the first panoramic image is estimated.

Then, gradients of multiple pixels in x and y directions in the 2D depth map are calculated. For example, two convolution kernels may be defined in advance, and convolution operation is performed on the 2D depth image through the two convolution kernels, respectively, thereby obtaining gradient values of multiple pixels in x and y directions in the 2D depth map.

Pixels are filtered according to a preset threshold, that is, pixels whose gradient values in the x direction and y direction in the 2D depth map are both greater than the preset threshold are regarded as noise pixels and are deleted to realize noise filtering and obtain a target depth map.

And then, the target depth map is mapped to a 3D point cloud of the first 3D image through 3D geometry.

In addition, the first panoramic image may be reduced, i.e., reducing its size, to obtain a compressed 3D image; and first feature point information of the compressed 3D image can be extracted through the ORB algorithm, thereby improving extraction efficiency of the feature point information and reducing memory consumption. The second feature point information of the second panoramic image may also be extracted. A shooting point of the second panoramic image is adjacent to a shooting point of the first panoramic image. The first panoramic image and the second panoramic image are panoramic images obtained by photographing a room at adjacent shooting points. The process of extracting the second feature point information of the second panoramic image is the same as that of extracting the first feature point information of the compressed 3D image, except for that the images are different, i.e., the former is the second panoramic image, and the latter is the compressed 3D image.

The most similar 8 feature point pairs in the adjacent first panoramic image and the second panoramic image are determined, and the 8-point method is used to solve the essential matrix of the first panoramic image and the second panoramic image. Then, a relative pose of the first panoramic image and the second panoramic image is determined by using the essential matrix, thereby improving the efficiency of obtaining relative position.

The 3D point cloud of the first panoramic image is merged with the 3D point cloud of the second panoramic image through the relative pose to obtain a 3D point cloud of the room, thereby improving accuracy of the obtained 3D point cloud of the room.

In the embodiments of the present disclosure, the point cloud denoising mode is improved, and calculation on the 2D image is more memory-saving and time-consuming than calculation on the 3D image. In addition, the relative pose can be calculated by using the N feature point pairs with the highest similarity selected in the 3D images whose shooting position points are adjacent, instead of using all special point pairs, which can further reduce runtime while ensuring accuracy of the relative pose.

Figure 4A:
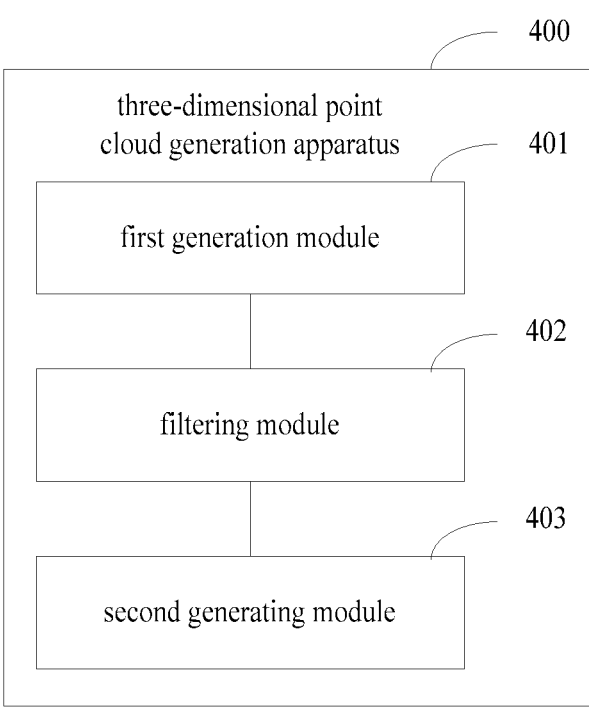
FIG. 4a is a first schematic structural diagram of a three-dimensional point cloud generation apparatus according to an embodiment of the present disclosure.

As shown in FIG. 4a, according to an embodiment of the present disclosure, the present disclosure provides a three-dimensional point cloud generation apparatus 400, which can be applied to an electronic device. The apparatus 400 includes:

a first generation module 401 configured to generate a two-dimensional (2D) depth map of a first three-dimensional (3D) image;

a filtering module 402 configured to calculate gradient values of multiple pixels in the 2D depth image, and perform filter process on the 2D depth image based on the gradient values of the multiple pixels to obtain a target depth image; and a second generating module 403 configured to generate a 3D point cloud of the first 3D image based on the target depth map.

Figure 4B:
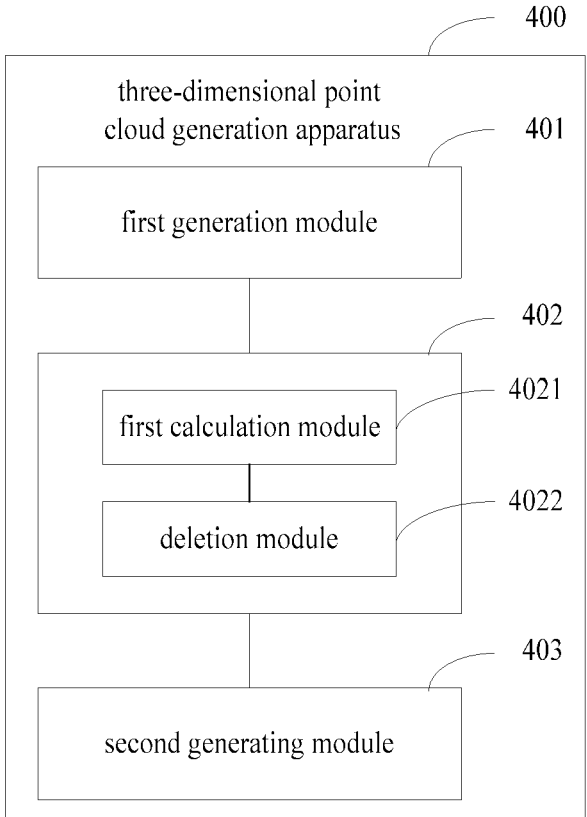
FIG. 4b is a second schematic structural diagram of a three-dimensional point cloud generation apparatus according to an embodiment of the present disclosure.

As shown in FIG. 4b, in one embodiment, the filtering module 402 includes:

a first calculation module 4021 configured to calculate gradient values of multiple pixels in the 2D depth map in a first direction and a second direction, where the first direction is perpendicular to the second direction;

a deletion module 4022 configured to delete each pixel whose gradient values in the first direction and the second direction in the 2D depth map are greater than preset thresholds, to obtain a target depth map.

In one embodiment, the calculating gradient values of multiple pixels in the 2D depth map in a first direction and a second direction, includes:

performing a convolution operation on the 2D depth image through two predefined convolution kernels to obtain the gradient values of multiple pixels in the 2D depth map in the first direction and the second direction, where the two convolution kernels are corresponding to the first direction and the second direction, respectively.

Figure 4C:
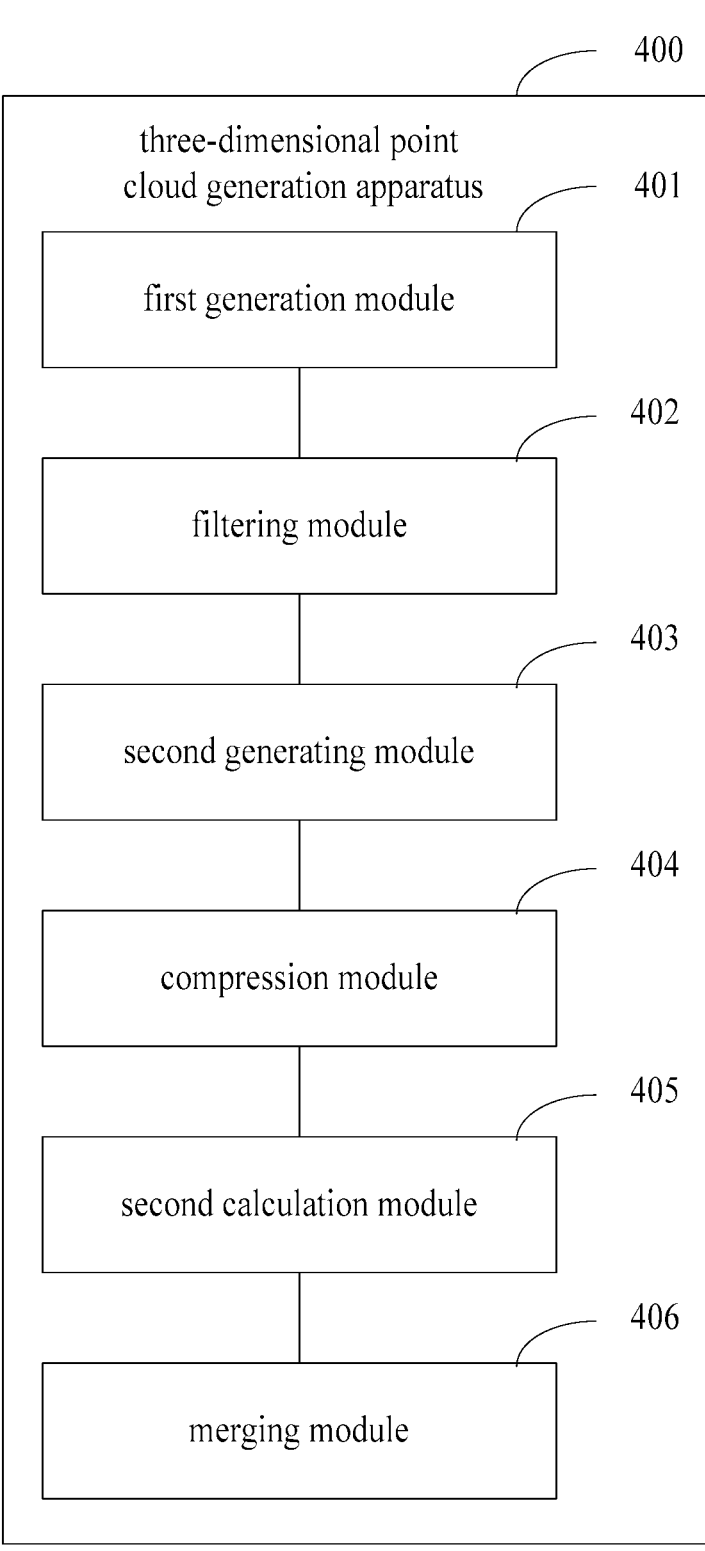
FIG. 4c is a third schematic structural diagram of a three-dimensional point cloud generation apparatus according to an embodiment of the present disclosure.

As shown in FIG. 4c, in one embodiment, the apparatus further includes:

a compression module 404 configured to compress sizes of the first 3D image to obtain a compressed 3D image;

a second calculation module 405 configured to calculate a relative pose of the first 3D image and a second 3D image based on the compressed 3D image; where a shooting point of the second 3D image is adjacent to a shooting point of the first 3D image, and the first 3D image and the second 3D image are panoramic images obtained by shooting a target object at adjacent shooting points; and a merging module 406 configured to merge the 3D point cloud of the first 3D image and a 3D point cloud of the second 3D image based on the relative pose, thereby obtaining a 3D point cloud of the target object.

In one embodiment, the second calculation module 405 includes:

an extraction module configured to extract first feature point information of the compressed 3D image;

a calculation unit configured to, based on the first feature point information and second feature point information of the second 3D image, calculate the relative pose of the first 3D image and the second 3D image.

In one embodiment, the calculation unit includes:

a feature point pair determination subunit configured to, based on the first feature point information and the second feature point information of the second 3D image, determine N feature point pairs of the first 3D image and the second 3D image; where similarity of at least some feature point pairs of the N feature point pairs is higher than that of other feature point pairs, and the other feature point pairs are feature point pairs other than the N feature point pairs in the first 3D image and the second 3D image and N is an integer greater than 1;

a matrix calculation subunit configured to calculate an essential matrix of the first 3D image and the second 3D image based on the N feature point pairs; and a pose determination subunit configured to determine the relative pose of the first 3D image and the second 3D image according to the essential matrix.

The 3D point cloud generation apparatuses of the foregoing embodiments are apparatuses for implementing the 3D point cloud generation methods of the foregoing embodiments, with corresponding technical features and corresponding technical effects, which will not be repeated here.

In the technical solution of the present disclosure, involved acquisition, storage and application of user's personal information are all in compliance with provisions of relevant laws and regulations, and do not violate public order and good customs.

According to embodiments of the present disclosure, an electronic device, a readable storage medium and a computer program product are further provided.

Figure 5:
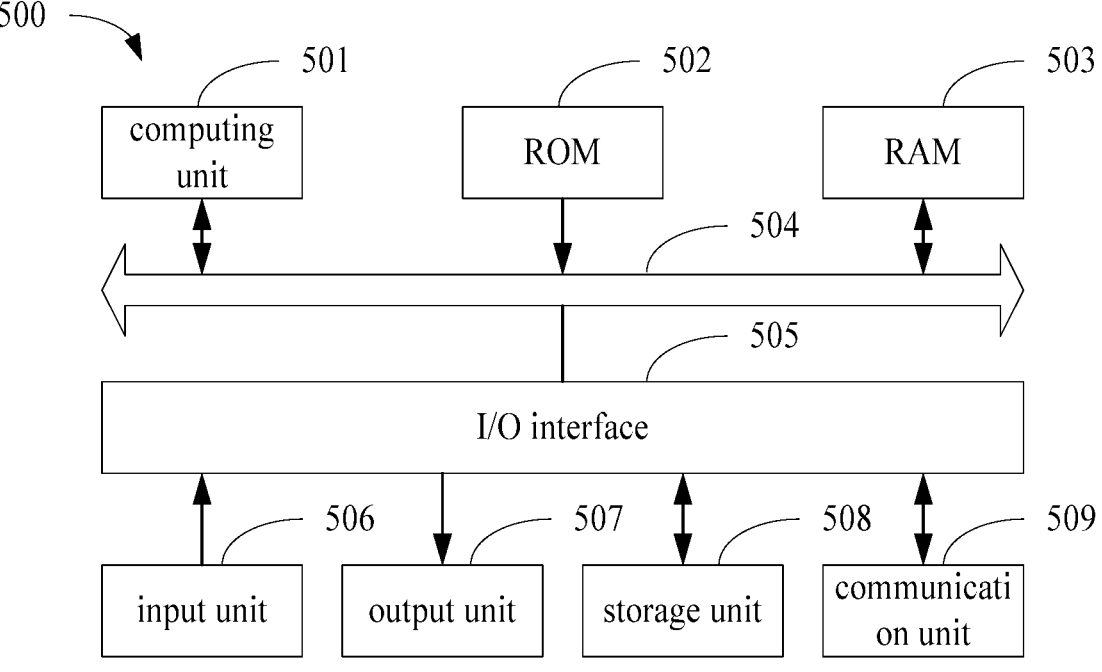
FIG. 5 is a block diagram of an electronic device for implementing a three-dimensional point cloud generation method according to an embodiment of the present disclosure.

FIG. 5 is a schematic block diagram of an exemplary electronic device 500 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 5, the device 500 includes a computing unit 501. The computing unit 501 may carry out various suitable actions and processes according to a computer program stored in a read-only memory (ROM) 502 or a computer program loaded from a storage unit 508 into a random access memory (RAM) 503. The RAM 503 may as well store therein all kinds of programs and data required for the operation of the device 500. The computing unit 501, the ROM 502 and the RAM 503 are connected to each other through a bus 504. An input/output (I/O) interface 505 is also connected to the bus 504.

Multiple components in the device 500 are connected to the I/O interface 505. The multiple components include: an input unit 506, e.g., a keyboard, a mouse and the like; an output unit 507, e.g., a variety of displays, loudspeakers, and the like; a storage unit 508, e.g., a magnetic disk, an optic disc and the like; and a communication unit 509, e.g., a network card, a modem, a wireless transceiver, and the like. The communication unit 509 allows the device 500 to exchange information/data with other devices through a computer network and/or other telecommunication networks, such as the Internet.

The computing unit 501 may be any general purpose and/or special purpose processing components having a processing and computing capability. Some examples of the computing unit 501 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 501 carries out the aforementioned methods and processes, e.g., the three-dimensional point cloud generation method. For example, in some embodiments, the three-dimensional point cloud generation method may be implemented as a computer software program tangibly embodied in a machine readable medium such as the storage unit 508. In some embodiments, all or a part of the computer program may be loaded and/or installed on the device 500 through the ROM 502 and/or the communication unit 509. When the computer program is loaded into the RAM 503 and executed by the computing unit 501, one or more steps of the foregoing three-dimensional point cloud generation method may be implemented. Optionally, in other embodiments, the computing unit 501 may be configured in any other suitable manner (e.g., by means of a firmware) to implement the three-dimensional point cloud generation method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), a computer hardware, a firmware, a software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other.

It is appreciated, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A three-dimensional point cloud generation method, comprising:
   generating a two-dimensional (2D) depth map of a first three-dimensional (3D) image;
   calculating gradient values of multiple pixels in the 2D depth map, and performing a filter process on the 2D depth map based on the gradient values of the multiple pixels to obtain a target depth map; and generating a 3D point cloud of the first 3D image based on the target depth map;

wherein the method further includes:

compressing the first 3D image to obtain a compressed 3D image;

calculating a relative pose of the first 3D image and a second 3D image based on the compressed 3D image;

wherein a shooting point of the second 3D image is adjacent to a shooting point of the first 3D image, and the first 3D image and the second 3D image are panoramic images obtained by shooting a target object at adjacent shooting points;

merging the 3D point cloud of the first 3D image and a 3D point cloud of the second 3D image based on the relative pose, thereby obtaining a 3D point cloud of the target object;

wherein calculating gradient values of multiple pixels in the 2D depth map, and performing the filter process on the 2D depth map based on the gradient values of the multiple pixels to obtain a target depth map, includes:

calculating gradient values of multiple pixels in the 2D depth map in a first direction and a second direction, wherein the first direction is perpendicular to the second direction;

deleting each pixel only when both of gradient values of the each pixel in the first direction and the second direction in the 2D depth map are greater than preset thresholds, to obtain the target depth map.

2. The method according to claim 1, wherein the calculating gradient values of multiple pixels in the 2D depth map in a first direction and a second direction, includes:

performing a convolution operation on the 2D depth map through two predefined convolution kernels to obtain the gradient values of multiple pixels in the 2D depth map in the first direction and the second direction, wherein the two convolution kernels are corresponding to the first direction and the second direction, respectively.

3. The method according to claim 1, wherein calculating the relative pose of the first 3D image and a second 3D image based on the compressed 3D image, includes:

extracting first feature point information of the compressed 3D image;

calculating the relative pose of the first 3D image and the second 3D image based on the first feature point information and second feature point information of the second 3D image.

4. The method according to claim 3, wherein calculating the relative pose of the first 3D image and the second 3D image based on the first feature point information and second feature point information of the second 3D image, includes:

based on the first feature point information and the second feature point information of the second 3D image, determining N feature point pairs of the first 3D image and the second 3D image; wherein similarity of at least some feature point pairs of the N feature point pairs is higher than that of other feature point pairs, and the other feature point pairs are feature point pairs other than the N feature point pairs in the first 3D image and the second 3D image and N is an integer greater than 1;

calculating an essential matrix of the first 3D image and the second 3D image based on the N feature point pairs; and determining the relative pose of the first 3D image and the second 3D image according to the essential matrix.

5. A non-transitory computer program product, comprising a computer program, wherein the computer program is configured to be executed by a processor, to implement the method according to claim 1.

6. An electronic device, comprising:

at least one processor; and a memory communicatively coupled to the at least one processor;

wherein the memory stores therein at least one instruction configured to be executed by the at least one processor, and the at least one processor is configured to execute the at least one instruction to implement:

generating a two-dimensional (2D) depth map of a first three-dimensional (3D) image;

calculating gradient values of multiple pixels in the 2D depth map, and performing a filter process on the 2D depth map based on the gradient values of the multiple pixels to obtain a target depth map; and generating a 3D point cloud of the first 3D image based on the target depth map;

wherein the at least one processor is configured to execute the at least one instruction to further implement:

compressing the first 3D image to obtain a compressed 3D image;

calculating a relative pose of the first 3D image and a second 3D image based on the compressed 3D image;

wherein a shooting point of the second 3D image is adjacent to a shooting point of the first 3D image, and the first 3D image and the second 3D image are panoramic images obtained by shooting a target object at adjacent shooting points;

merging the 3D point cloud of the first 3D image and a 3D point cloud of the second 3D image based on the relative pose, thereby obtaining a 3D point cloud of the target object;

wherein when calculating gradient values of multiple pixels in the 2D depth map, and performing the filter process on the 2D depth map based on the gradient values of the multiple pixels to obtain a target depth map, the at least one processor is configured to execute the at least one instruction to implement:

calculating gradient values of multiple pixels in the 2D depth map in a first direction and a second direction, wherein the first direction is perpendicular to the second direction;

deleting each pixel only when both of gradient values of the each pixel in the first direction and the second direction in the 2D depth map are greater than preset thresholds, to obtain the target depth map.

7. The electronic device according to claim 6, wherein when calculating gradient values of multiple pixels in the 2D depth map in a first direction and a second direction, the at least one processor is configured to execute the at least one instruction to implement:

performing a convolution operation on the 2D depth map through two predefined convolution kernels to obtain the gradient values of multiple pixels in the 2D depth map in the first direction and the second direction, wherein the two convolution kernels are corresponding to the first direction and the second direction, respectively.

8. The electronic device according to claim 7, wherein when calculating a relative pose of the first 3D image and a second 3D image based on the compressed 3D image, the at least one processor is configured to execute the at least one instruction to implement:

extracting first feature point information of the compressed 3D image;

calculating the relative pose of the first 3D image and the second 3D image based on the first feature point information and second feature point information of the second 3D image.

9. The electronic device according to claim 8, wherein when calculating the relative pose of the first 3D image and the second 3D image based on the first feature point information and second feature point information of the second 3D image, the at least one processor is configured to execute the at least one instruction to implement:

based on the first feature point information and the second feature point information of the second 3D image, determining N feature point pairs of the first 3D image and the second 3D image;

wherein similarity of at least some feature point pairs of the N feature point pairs is higher than that of other feature point pairs, and the other feature point pairs are feature point pairs other than the N feature point pairs in the first 3D image and the second 3D image and N is an integer greater than 1;

calculating an essential matrix of the first 3D image and the second 3D image based on the N feature point pairs; and determining the relative pose of the first 3D image and the second 3D image according to the essential matrix.

10. A non-transitory computer readable storage medium, storing therein at least one computer instruction, wherein the at least one computer instruction is configured to be executed by a computer to implement:

generating a two-dimensional (2D) depth map of a first three-dimensional (3D) image;

calculating gradient values of multiple pixels in the 2D depth map, and performing filter process on the 2D depth map based on the gradient values of the multiple pixels to obtain a target depth map; and generating a 3D point cloud of the first 3D image based on the target depth map;

wherein the at least one computer instruction is configured to be executed by the computer to further implement:

compressing sizes of the first 3D image to obtain a compressed 3D image;

calculating a relative pose of the first 3D image and a second 3D image based on the compressed 3D image; wherein a shooting point of the second 3D image is adjacent to a shooting point of the first 3D image, and the first 3D image and the second 3D image are panoramic images obtained by shooting a target object at adjacent shooting points;

merging the 3D point cloud of the first 3D image and a 3D point cloud of the second 3D image based on the relative pose, thereby obtaining a 3D point cloud of the target object;

wherein when calculating gradient values of multiple pixels in the 2D depth map, and performing filter process on the 2D depth map based on the gradient values of the multiple pixels to obtain a target depth map, the at least one computer instruction is configured to be executed by the computer to implement:

calculating gradient values of multiple pixels in the 2D depth map in a first direction and a second direction, wherein the first direction is perpendicular to the second direction;

deleting each pixel only when both of gradient values of the each pixel in the first direction and the second direction in the 2D depth map are greater than preset thresholds, to obtain the target depth map.

11. The non-transitory computer readable storage medium according to claim 10, wherein when calculating gradient values of multiple pixels in the 2D depth map in a first direction and a second direction, the at least one computer instruction is configured to be executed by the computer to implement:

performing a convolution operation on the 2D depth map through two predefined convolution kernels to obtain the gradient values of multiple pixels in the 2D depth map in the first direction and the second direction, wherein the two convolution kernels are corresponding to the first direction and the second direction, respectively.

12. The non-transitory computer readable storage medium according to claim 10, wherein when calculating a relative pose of the first 3D image and a second 3D image based on the compressed 3D image, the at least one computer instruction is configured to be executed by the computer to implement:

extracting first feature point information of the compressed 3D image;

calculating the relative pose of the first 3D image and the second 3D image based on the first feature point information and second feature point information of the second 3D image.

13. The non-transitory computer readable storage medium according to claim 12, wherein when calculating the relative pose of the first 3D image and the second 3D image based on the first feature point information and second feature point information of the second 3D image, the at least one computer instruction is configured to be executed by the computer to implement:

based on the first feature point information and the second feature point information of the second 3D image, determining N feature point pairs of the first 3D image and the second 3D image; wherein similarity of at least some feature point pairs of the N feature point pairs is higher than that of other feature point pairs, and the other feature point pairs are feature point pairs other than the N feature point pairs in the first 3D image and the second 3D image and N is an integer greater than 1;

calculating an essential matrix of the first 3D image and the second 3D image based on the N feature point pairs; and determining the relative pose of the first 3D image and the second 3D image according to the essential matrix.

\* \* \* \* \*